US010697897B2

(12) United States Patent
Ienaga et al.

(10) Patent No.: US 10,697,897 B2
(45) Date of Patent: Jun. 30, 2020

(54) INSPECTION SYSTEM, INSPECTION DEVICE, AND INSPECTING METHOD

(71) Applicant: MITSUBISHI HEAVY INDUSTRIES, LTD., Tokyo (JP)

(72) Inventors: Hirofumi Ienaga, Tokyo (JP); Keisuke Maruko, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 16/325,505

(22) PCT Filed: Nov. 13, 2017

(86) PCT No.: PCT/JP2017/040782
§ 371 (c)(1),
(2) Date: Feb. 14, 2019

(87) PCT Pub. No.: WO2018/092726
PCT Pub. Date: May 24, 2018

(65) Prior Publication Data
US 2019/0170658 A1 Jun. 6, 2019

(30) Foreign Application Priority Data
Nov. 21, 2016 (JP) .................................. 2016-226203

(51) Int. Cl.
*G01N 21/95* (2006.01)
*G01N 21/88* (2006.01)
(Continued)

(52) U.S. Cl.
CPC ......... *G01N 21/8806* (2013.01); *G01N 21/88* (2013.01); *G01N 21/954* (2013.01);
(Continued)

(58) Field of Classification Search
CPC ............. G01N 21/8806; G01N 29/043; G01N 2291/0231; G01N 2291/044
(Continued)

(56) References Cited

U.S. PATENT DOCUMENTS 4,865,448 A    9/1989   Akutsu et al.
5,317,387 A *   5/1994   Van Hengel ........... G01N 21/88
                                                                   356/446
(Continued)

FOREIGN PATENT DOCUMENTS

EP         1873519 A2    1/2008
EP         2554986 A1    2/2013
(Continued)

OTHER PUBLICATIONS

Extended European Search Report for European Application No. 17871528.0 dated Jun. 26, 2019; 9pp.
(Continued)

*Primary Examiner* — Tarun Sinha
(74) *Attorney, Agent, or Firm* — Kanesaka Berner and Partners LLP

(57) ABSTRACT

An inspection system for inspecting a composite material member formed of a composite material has a main body part; an ultrasonic probe connected with the main body part and configured to contact the main surface; an optical sensor part connected to the main body part to be movable in a first direction; and a processor. The ultrasonic probe is configured to input ultrasonic wave to the main surface of the composite material member and to receive reflection wave generated from the ultrasonic wave reflected by the composite material member. The optical sensor part is configured to emit sensor light in a second direction orthogonal to the first direction, and to receive reflection light generated from the sensor light reflected on the intersection surface.
(Continued)

The processor is configured to output a measurement result based on the reflection wave and the reflection light.

9 Claims, 10 Drawing Sheets

(51) Int. Cl.
    *G01N 29/04* (2006.01)
    *G01N 21/954* (2006.01)
    *G01N 21/84* (2006.01)

(52) U.S. Cl.
    CPC .......... *G01N 29/04* (2013.01); *G01N 29/043* (2013.01); *G01N 2021/8438* (2013.01); *G01N 2021/8472* (2013.01); *G01N 2021/9548* (2013.01); *G01N 2291/0231* (2013.01); *G01N 2291/044* (2013.01)

(58) Field of Classification Search
    USPC .......................................................... 73/627
    See application file for complete search history.

(56) References Cited

U.S. PATENT DOCUMENTS

| | | | | |
|---|---|---|---|---|
| 2009/0126494 | A1* | 5/2009 | Karasawa | ............ G01N 29/226 73/620 |
| 2009/0189485 | A1* | 7/2009 | Iyoki | ...................... B82Y 35/00 310/317 |
| 2012/0035862 | A1 | 2/2012 | Kollgaard et al. | |
| 2014/0360289 | A1 | 12/2014 | Georgeson et al. | |

FOREIGN PATENT DOCUMENTS

| | | |
|---|---|---|
| JP | S61155754 A | 7/1986 |
| JP | H02129544 A | 5/1990 |
| JP | 2005195483 A | 7/2005 |
| JP | 2011033541 A | 2/2011 |

OTHER PUBLICATIONS

English Translation of the Written Opinion of the International Searching Authority for International Application No. PCT/JP2017/040782 dated Mar. 7, 2019; 10pp.

* cited by examiner

INSPECTION SYSTEM, INSPECTION DEVICE, AND INSPECTING METHOD

RELATED APPLICATIONS

The present application is a National Phase of International Application Number PCT/JP2017/040782 filed Nov. 13, 2017 and claims priority to Japanese Application Number 2016-226203 filed Nov. 21, 2016.

TECHNICAL FIELD

The present invention relates to an inspection system, an inspection device and an inspecting method, and especially, to inspection of a member formed of composite material.

BACKGROUND ART

As exemplified by carbon fiber reinforced plastic (CFRP) and glass fiber reinforced plastics (GFRP), the composite material in which a resin and fiber are combined is widely used in various industrial fields such as aircraft.

In a member formed of composite material (to be referred merely to as "a composite material member" below), a defect often occurs. Especially, when mechanical processing (e.g. drilling) is carried out to the composite material member, a defect caused by damage due to the mechanical processing sometimes occurs. To confirm the existence or non-existence of such a defect, an inspection is carried out in a manufacturing process and a processing process of the composite material member.

The most typical inspection method of the composite material member is an ultrasonic inspection. In the ultrasonic inspection, ultrasonic wave is incident to the composite material member and the reflection wave returned from the composite material member is acquired. The position and size of a defect can be detected from information contained in this reflection wave.

However, when a plurality of defects are arranged in the incidence direction of the ultrasonic wave, there is a case which is insufficient to the detection of a defect by the ultrasonic inspection. When the plurality of defects are arranged in the incidence direction of the ultrasonic wave, the ultrasonic wave is reflected by the defect which is the nearest to the incident position of the ultrasonic wave. In such a case, only the defect which is the nearest to the incident position can be detected in the ultrasonic inspection, and the detection miss of the defect can occur. Especially, an interlayer delamination occurs when mechanical processing is carried out to the composite material member in which sheets or cloths formed of fiber are stacked, and the interlayer delamination is easy to generate in a specific direction (for example, a direction in which the fiber sheets and the fiber cloths are stacked) so that it is easy for an inspection error of the defect to occur.

Note that the ultrasonic inspection of a though-hole formed in the composite material is disclosed in US 2012/0035862 A1.

CITATION LIST

Patent Literature

[Patent Literature 1] US 2012/0035862 A1

SUMMARY OF THE INVENTION

Therefore, an object of the present invention is to provide a technique of detecting defects of a composite material member when it is assumed that a plurality of defects are arranged in an incidence direction of ultrasonic wave emitted from a ultrasonic probe.

Other objects of the present invention will be understood to the skilled person from the following disclosure.

In an aspect of the present invention, an inspection system is provided to inspect a composite material member which is formed of a composite material and which has a main surface and an intersection surface intersecting the main surface. The inspection system has a main body part; an ultrasonic probe connected with the main body part and configured to be brought into contact with the main surface; an optical sensor part connected to the main body part to be movable in a first direction; and a processor. The ultrasonic probe is configured to input ultrasonic wave to the main surface of the composite material member and to receive reflection wave generated from the ultrasonic wave reflected by the composite material member. The optical sensor part is configured to emit sensor light in a second direction orthogonal to the first direction, and to receive reflection light generated from the sensor light reflected on the intersection surface. The processor is configured to output a measurement result based on the reflection wave and the reflection light.

In one embodiment, the inspection system may further include an actuator configured to move the optical sensor part to the first direction. In this case, the emission of the sensor light and the reception of the reflection light are carried out while moving the optical sensor part to the first direction by the actuator.

In a preferable embodiment, the ultrasonic probe is connected with the main body part to be movable to a third direction orthogonal to the first direction.

In a preferable embodiment, the optical sensor part has an optical sensor configured to emit a sensor light, receive a reflection light and generate an output signal corresponding to the reflection light; and a pipe member having a circular cylindrical surface which has a central axis parallel to the first direction. The optical sensor is housed in the pipe member, and the pipe member is connected with the main body part to be movable to the first direction.

In another aspect of the present invention, an inspection device configured to inspect a composite material member formed of a composite material which has a main surface and an intersection surface which intersects the main surface. The inspection device has a main body part; an ultrasonic probe connected with the main body part and brought into contact with the main surface; and an optical sensor part connected with the main body part to be movable to the first direction. The ultrasonic probe is configured to output an ultrasonic wave to the main surface of the composite material, receive a reflection wave generated by reflecting the ultrasonic wave by the composite material, and output a first output signal corresponding to the reflection wave. The optical sensor part is configured to output sensor light to a second direction orthogonal to the first direction, receive the reflection light generated by reflecting the sensor light on the intersection surface, and output a second output signal corresponding to the reflection light.

In still another aspect of the present invention, an inspecting method of inspecting a composite material member which has a main surface and an intersection surface intersecting the main surface is provided. The inspecting method includes (A) bringing a ultrasonic probe into contact with the main surface to output a ultrasonic wave from the ultrasonic probe to the main surface; (B) receiving a reflection wave generated by reflecting the ultrasonic wave by the composite material member; (C) outputting a sensor light to a second direction orthogonal to a first direction while moving the optical sensor to the first direction along the intersection surface; (D) receiving a reflection light generated by reflecting the sensor light on the intersection surface; and (E) outputting a measurement result acquired based on the reflection wave and the reflection light.

Such an inspecting method is especially suitable when the intersection surface is a side wall surface of a though-hole formed to the composite material member by drilling.

In one embodiment, the optical sensor may be housed in a pipe member that has a circular cylindrical surface which has a central axis parallel to the first direction. In this case, the pipe member has a diameter corresponding to a diameter of the though-hole.

In one embodiment, it is desirable that the (A) to (E) are repeatedly carried out while changing an orientation of the second direction.

According to the present invention, even when it is assumed that a plurality of defects are arranged in an incidence direction of an ultrasonic wave emitted from the ultrasonic probe, the defect of the composite material member can be detected.

DESCRIPTION OF EMBODIMENTS

The structure of a composite material member to be inspected in an embodiment and problems that would occur in an ultrasonic inspection of the composite material member will be described.

Figure 1:
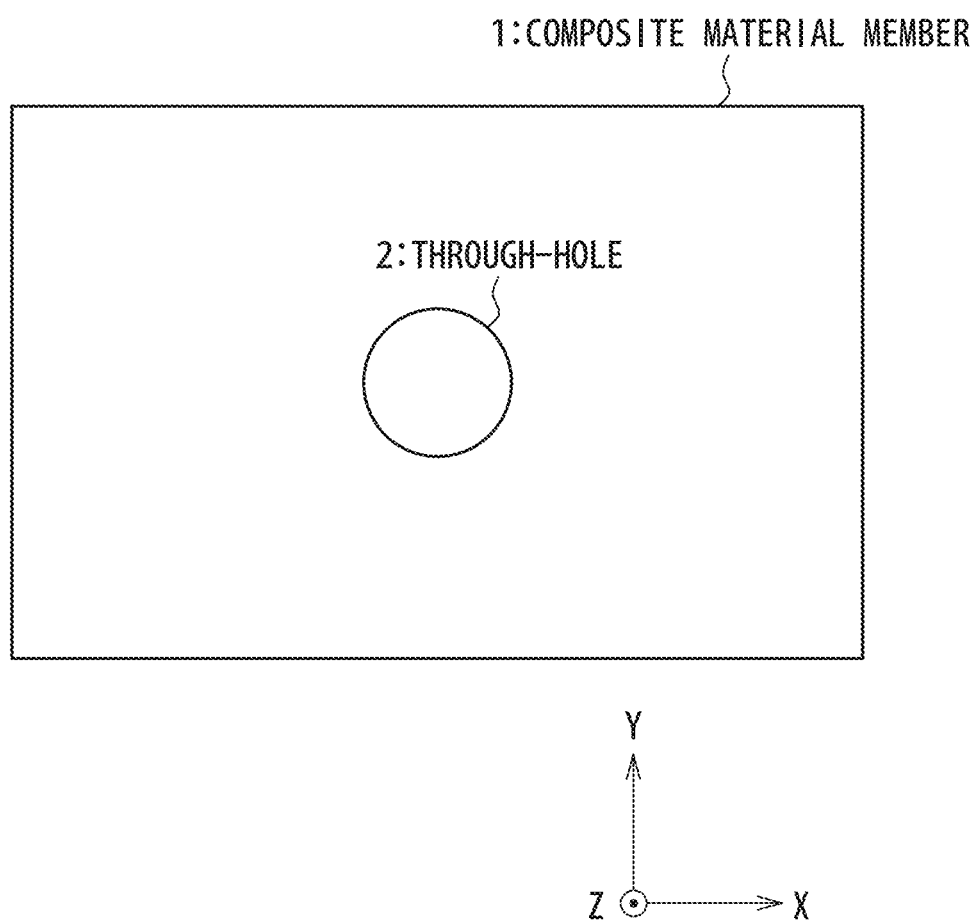
FIG. 1 is a top view showing an example of structure of a composite material member to be inspected in an embodiment.
Figure 2:
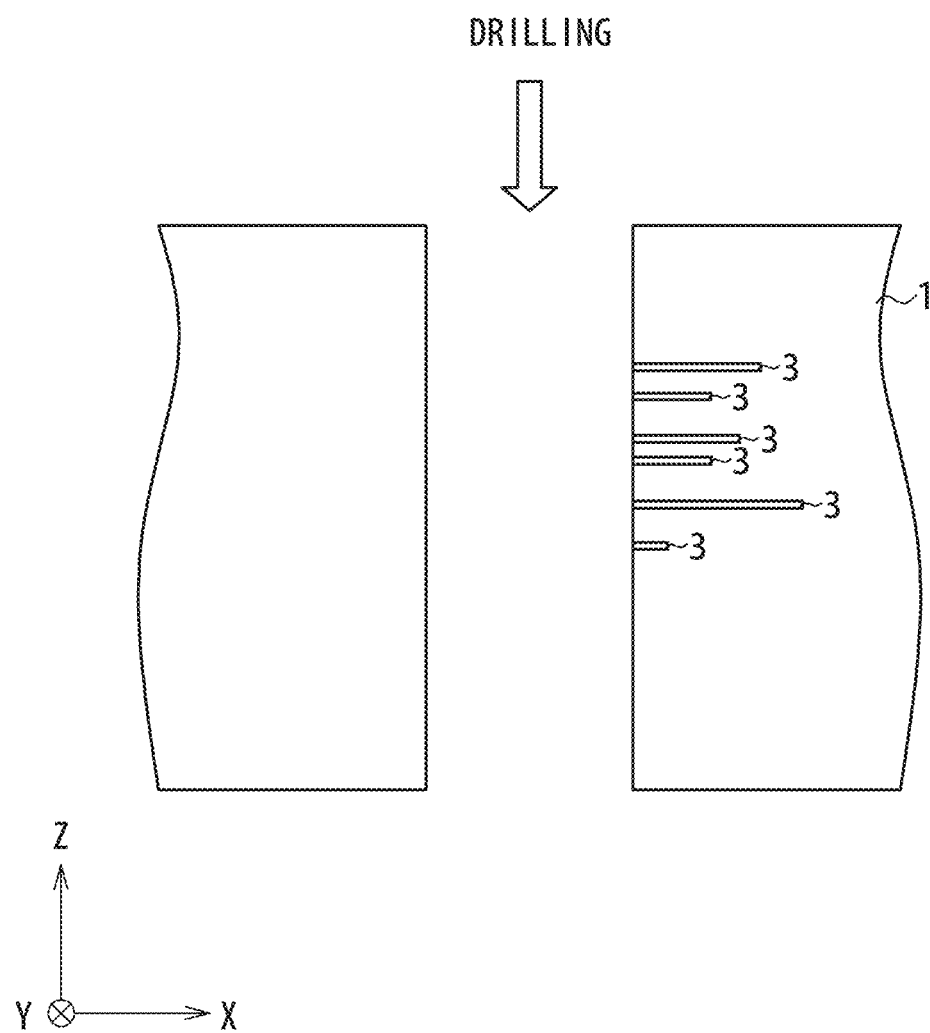
FIG. 2 is a partial expanded cross-sectional view showing the structure in the neighborhood of a through-hole of the composite material member shown in FIG. 1.

FIG. 1 is a top view showing an example of structure of the composite material member 1 to be inspected in the present embodiment. FIG. 2 is an expanded cross-sectional view partially showing the structure of the composite material member 1 shown in FIG. 1. In the following description, a XYZ Cartesian coordinate system is introduced. In the XYZ Cartesian coordinate system, the Z-axial direction is defined as a thickness direction of the composite material member 1, and the X and Y-axial directions are defined to orthogonalize to each other in a plane of the composite material member 1.

The composite material member 1 is formed of composite material (e.g. CFRP) in which resin and fiber are combined. In the present embodiment, the composite material member 1 is formed to have the shape of a plate. In the composite material member 1, the stacking direction of fiber sheets or fiber cloths (hereinafter, to be sometimes referred as "the stacking direction") is a thickness direction of the composite material member 1, i.e. in the Z-axial direction in FIG. 1 and FIG. 2.

It is supposed that a circular through-hole 2 is formed to penetrate the composite material member 1 having such a structure in the thickness direction (i.e. the stacking direction) of the composite material member 1 by drilling. In this case, there is a possibility that a defect occurs in the neighborhood of the though-hole 2. The most typical defect is an interlayer delamination in a side wall surface 2a of though-hole 2. When the interlayer delamination occurs, a defect 3 is formed to extend inside the composite material member 1 from the side wall surface 2a of though-hole 2 (note that the side wall surface 2a is a surface which intersects with the main surface 1a). When the interlayer delamination occurs, a plurality of defects 3 are formed to be arranged in line along the side wall surface 2a (i.e. in the stacking direction).

Because the generation of the defect 3 influences the reliability of the composite material member 1, it is desirable to inspect the composite material member 1 after drilling. In the inspection of the composite material member 1, the existence or non-existence of defects 3 is unambiguously evaluated. Also, when the existence of defects 3 is detected, it is desirable to specify the number of defects 3 and regions where the defects 3 exist. If the number of defects 3 and the regions where the defects 3 exist can be specified, basic data can be acquired to use for a condition determination of drilling and for a strength calculation of a structure which contains the composite material member 1.

Figure 3:
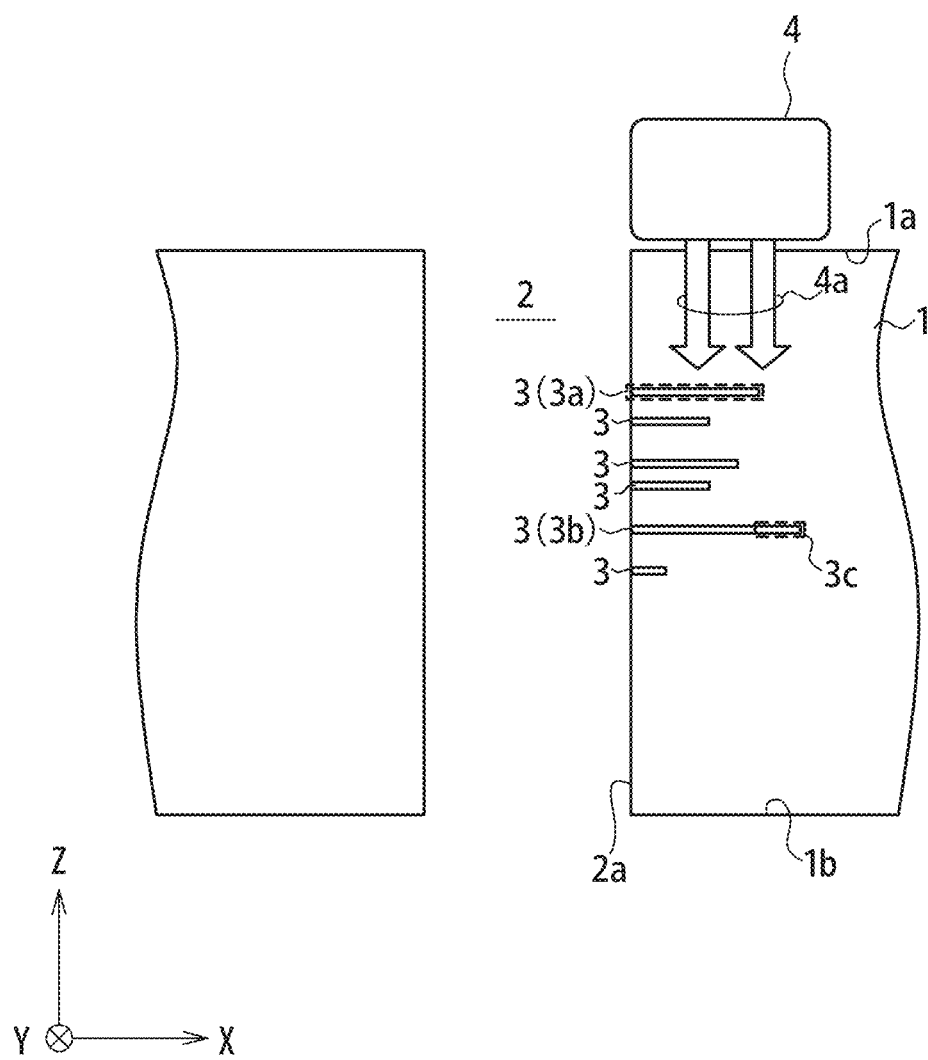
FIG. 3 is a conceptual diagram showing an example of ultrasonic inspection of the composite material member shown in FIG. 1.

One of easier techniques to detect the defect 3 is an ultrasonic inspection. According to the ultrasonic inspection, the defect 3 can be detected non-destructively. FIG. 3 is a conceptual diagram showing an example of ultrasonic inspection of the composite material member 1. When the ultrasonic inspection of the composite material member 1 is carried out, an ultrasonic probe 4 is pressed against the main surface 1a of the composite material member 1, and the ultrasonic wave 4a is inputted from the ultrasonic probe 4 to the main surface 1a. In the present embodiment, the input direction of the ultrasonic wave 4a is the thickness direction (the Z-axial direction) of the composite material member 1. The reflection wave which returns from the composite material member 1 is received by the ultrasonic probe 4, and the existence or non-existence of defect 3 can be determined from an ultrasonic image obtained from the reflected wave.

One problem of such an inspection method is in that it is possible to detect only the whole or part of defect 3 which the ultrasonic wave 4a can reach directly from the ultrasonic probe 4, when a plurality of defects 3 are arranged in the input direction of the ultrasonic wave 4a, that is, in the thickness direction of the composite material member 1 (i.e. in the stacking direction). For example, in the structure shown in FIG. 3, there are a defect 3a which is the nearest to the main surface 1a of the composite material member 1 and a defect 3b which is more distant from the main surface 1a than the defect 3a. In this case, only the defect 3a and a part 3c of defect 3b where the ultrasonic wave 4a is not shielded by the defect 3a can be detected. Such a problem is important, especially, when it is assumed that defects 3 occur in a part to which an access by the ultrasonic probe 4 is difficult.

From such a background, the provision of the technique is demanded which can appropriately detect the defects 3 generated in the composite material member 1 even when it is assumed that the plurality of defects are arranged in the input direction of the ultrasonic wave emitted from the ultrasonic probe 4. An inspection system, an inspection device and an inspecting method in the present embodiment which will be described below provide a technique to respond to such a demand.

Figure 4:
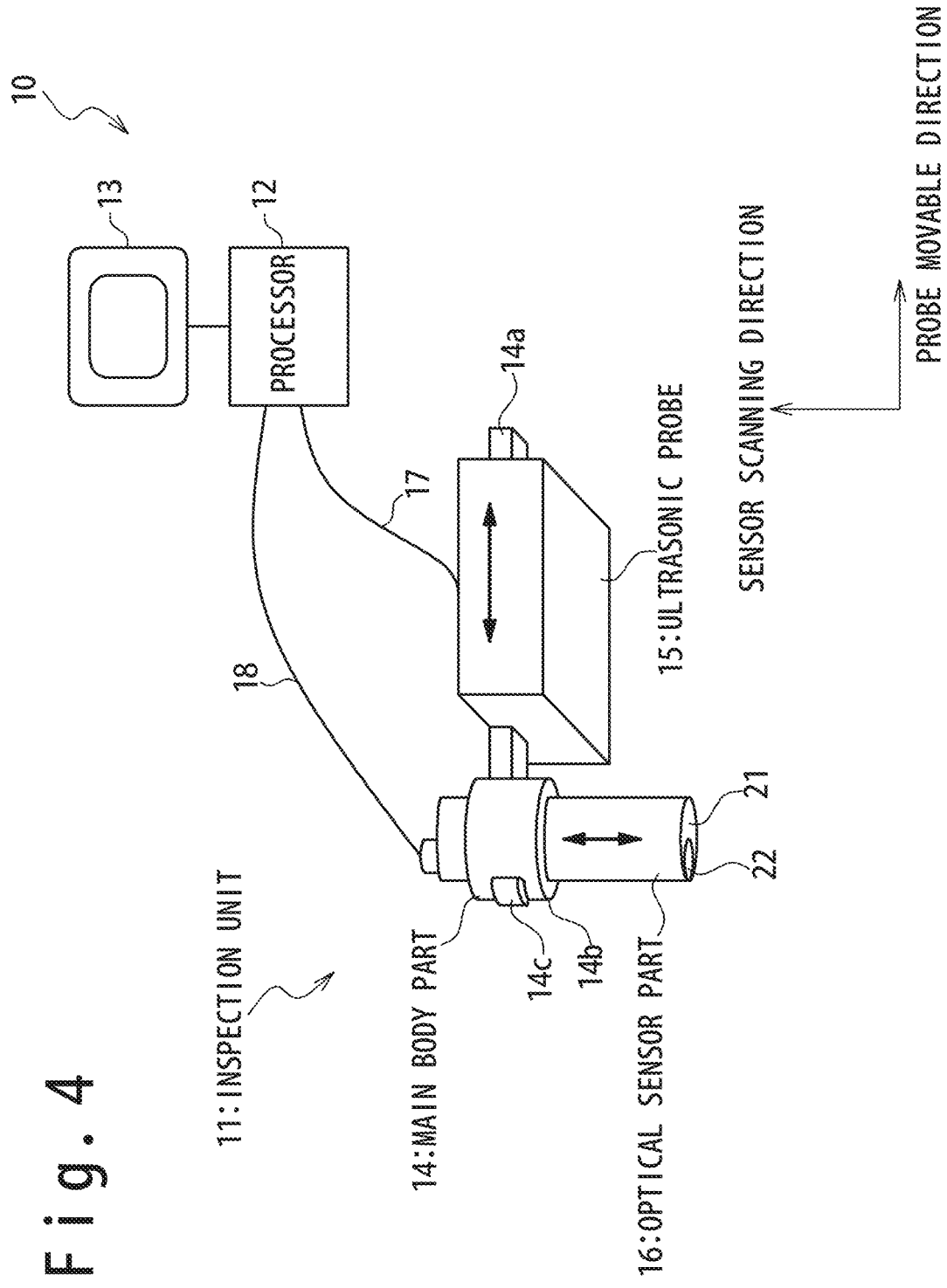
FIG. 4 is a conceptual diagram showing a configuration of an inspection system in a present embodiment.

FIG. 4 is s conceptual diagram showing the configuration of inspection system 10 in the present embodiment. An inspection system 10 includes an inspection device 11, a processor 12 and a display device 13.

Figure 5:
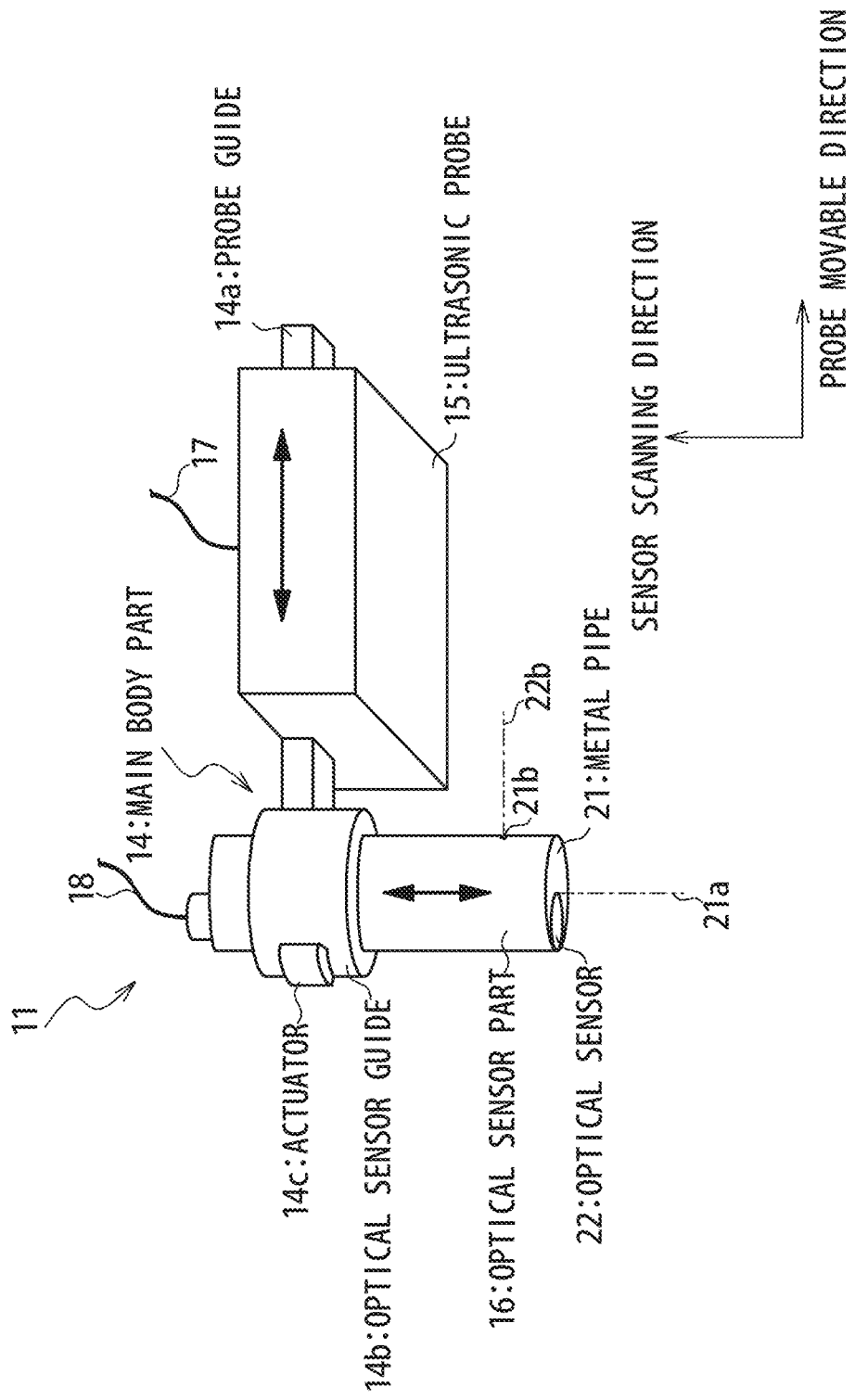
FIG. 5 is a perspective view showing an example of structure of an inspection device in the present embodiment.

FIG. 5 is a perspective view showing an example of the structure of inspection device 11. The inspection device 11 has a main body part 14, an ultrasonic probe 15 and an optical sensor part 16.

The main body part 14 of the inspection device 11 includes a probe guide 14a, an optical sensor guide 14b and an actuator 14c. The probe guide 14a holds the ultrasonic probe 15 to be movable in a specific direction. In the following description, this specific direction (i.e. the direction to which ultrasonic probe 15 is movable) is called "a probe movable direction". The position of the ultrasonic probe 15 in the probe movable direction can be adjusted by controlling the position of the ultrasonic probe 15 held by the probe guide 14a. The optical sensor guide 14b holds the optical sensor part 16 to be movable in a direction perpendicular to the probe movable direction. The perpendicular direction is called "a sensor scanning direction". The actuator 14c is configured to drive the optical sensor part 16 to move to "the sensor scanning direction".

The ultrasonic probe 15 is configured to emit the ultrasonic wave used in the ultrasonic inspection to the composite material member 1 and to receive a reflection wave generated when the ultrasonic wave is reflected by the composite material member 1, under the control of processor 12. The ultrasonic probe 15 generates an output signal corresponding to the reflection wave. The output signal generated by the ultrasonic probe 15 is transmitted to the processor 12 through a cable 17.

The optical sensor part 16 is inserted in the though-hole 2, and is used to detect the defects 3 exposed on the side wall surface 2a of the though-hole 2 by the optical inspection. In the inspection system 10 in the present embodiment, the defects 3 are detected by the optical inspection in addition to the ultrasonic inspection. The optical sensor part 16 has a metal pipe 21 and an optical sensor 22.

The metal pipe 21 is a pipe member which houses and maintains the optical sensor 22 in its inside. The metal pipe 21 has a cylindrical side surface and is held by the optical sensor guide 14b in the side surface. The central axis 21a of the metal pipe 21 is in parallel to the sensor scanning direction. The metal pipe 21 is used to keep a position relation of the optical sensor 22 and the side wall surface 2a of the though-hole 2. It is desirable that the metal pipe 21 is formed to have a diameter equivalent to the diameter of the though-hole (the diameter equal to or slightly smaller than the diameter of the though-hole 2).

Figure 6:
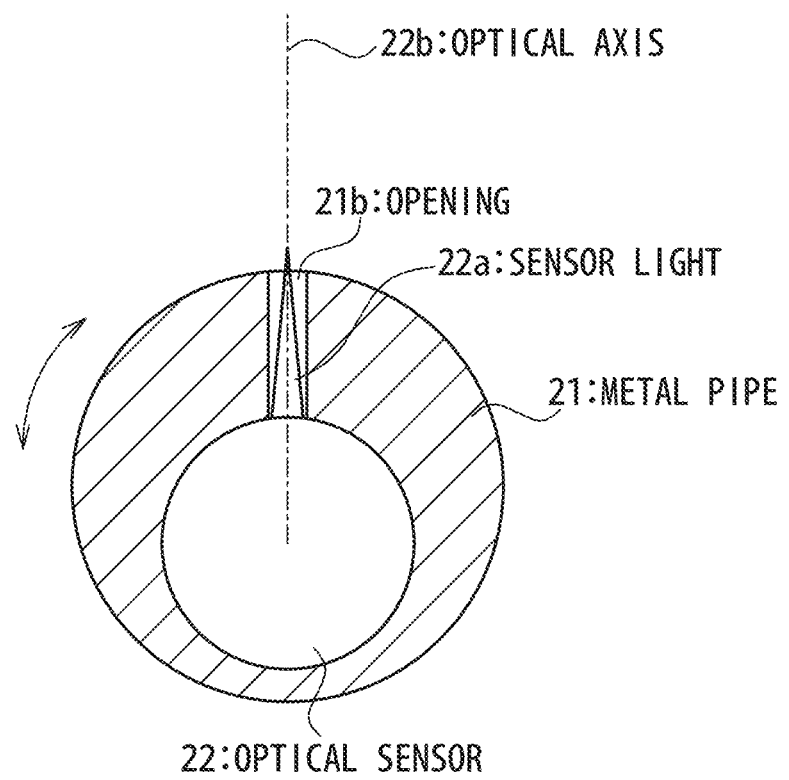
FIG. 6 is a partial cross-sectional view showing the structure of a metal pipe.

FIG. 6 is a partial cross-sectional view showing the structure of metal pipe 21. The metal pipe 21 has an opening 21b to pass the sensor light 22a emitted from the optical sensor 22. The optical sensor 22 is supported by the metal pipe 21 such that the optical axis 22b of the sensor light 22a turns to a direction perpendicular to the sensor scanning direction, i.e. a direction parallel to the probe movable direction in the present embodiment.

Referring to FIG. 5 again, the optical sensor 22 is configured to emit the sensor light in the direction perpendicular to the sensor scanning direction and to receive the reflection light generated from the sensor light reflected on the side wall surface 2a of the though-hole 2, under the control of processor 12. The optical sensor 22 generates an output signal corresponding to the reflection light. The output signal generated by the optical sensor 22 is transmitted to the processor 12 through the cable 18. In one embodiment, as the optical sensor 22, a light displacement sensor can be used.

Referring to FIG. 4 again, the processor 12 is configured to control the ultrasonic probe 15, the optical sensor 22 and the actuator 14c, and to process the output signal received from the ultrasonic probe 15 and the optical sensor 22 to output a measurement result. For example, the processor 12 processes the output signal received from the ultrasonic probe 15 and generates a desired ultrasonic image (e.g. B mode image) to display the ultrasonic image on the display device 13. Also, the processor 12 processes the output signal received from the optical sensor 22, and generates a defect detection image showing the existence or non-existence of defect 3 in each position of the side wall surface 2a of the though-hole 2 to display the generated defect detection image on the display device 13. When the defect 3 exposed on the side wall surface 2a of the though-hole 2 exists, the sensor light 22a is not reflected in the position of the existing defect 3 and the reflection light does not reach the optical sensor 22. Since the output signal outputted from the optical sensor 22 is generated in response to the reflection light, it is possible to determine the existence or non-existence of defect 3 in each position of the side wall surface 2a of the though-hole 2 based on the output signal outputted from the optical sensor 22. The processor 12 generates the defect detection image based on the output signal outputted from the optical sensor 22. Also, when a light displacement sensor is used as the optical sensor 22, it is possible to specify the shape of the side wall surface 2a of the though-hole 2 from information contained in the reflection light. In this case, the processor 12 may generate a profile image showing the shape of the side wall surface 2a of the though-hole 2 as the defect detection image.

Next, the procedure of inspecting the neighborhood of the though-hole 2 of the composite material member 1 by using the inspection system 10 in the present embodiment will be described.

Figure 7:
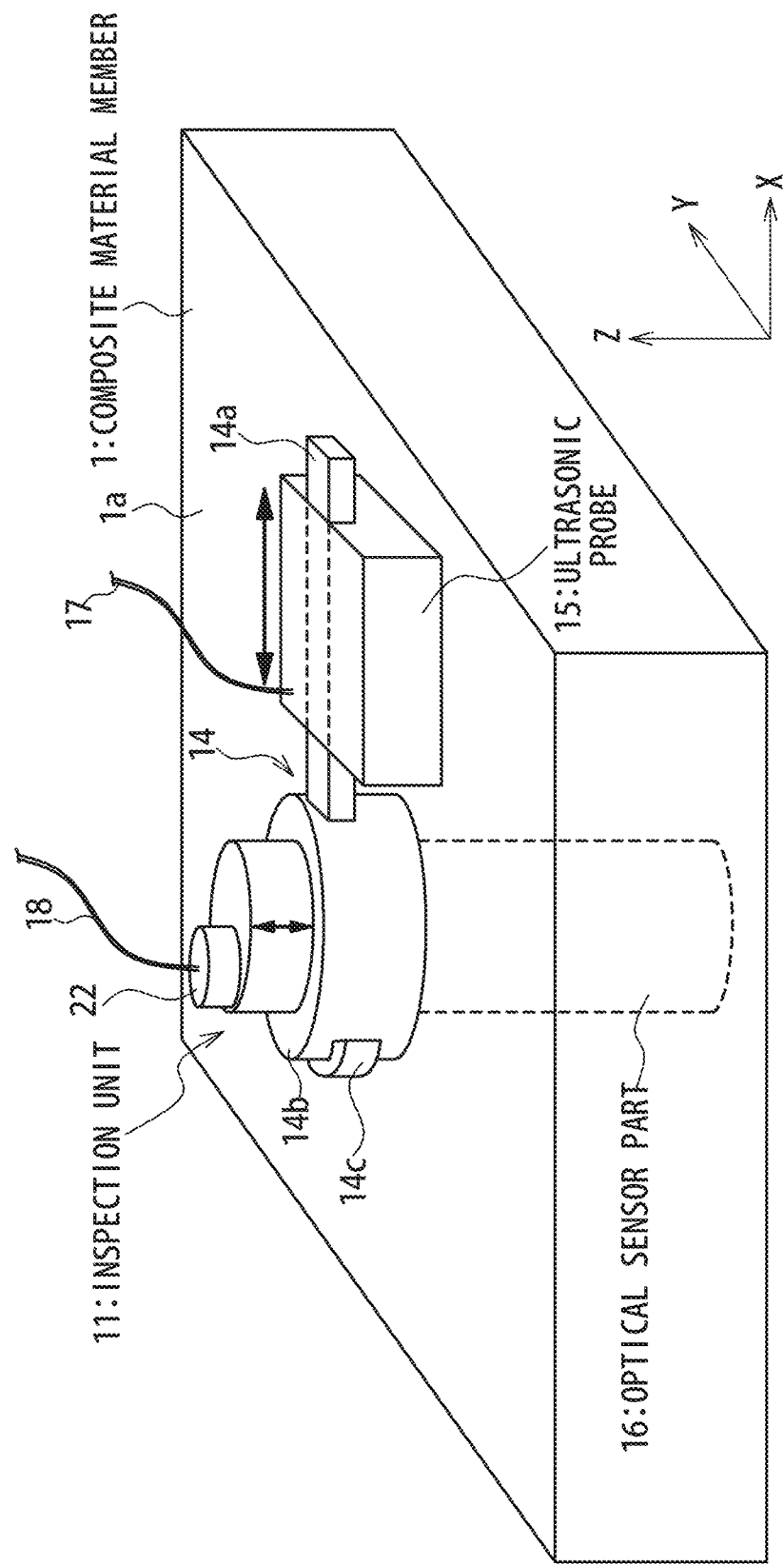
FIG. 7 is a perspective view showing an inspection of the composite material member by using the inspection system of the present embodiment.

First, the inspection device 11 is arranged on the composite material member 1. As shown in FIG. 7, in case of the arranging the inspection device 11, the optical sensor part 16 is inserted into the though-hole 2 of the composite material member 1, moreover, the ultrasonic probe 15 is pressed against the main surface 1a of the composite material member 1. The orientation of the probe guide 14a (i.e. the probe movable direction) and the position of the ultrasonic probe 15 in the probe movable direction are determined according to the position to be inspected. In FIG. 7, the orientation of the probe guide 14a is prescribed as the +X direction to the though-hole 2. In the following description, the orientation of the probe guide 14a is defined as an angle from the +X direction. That is, in the arrangement shown in FIG. 7, the orientation of the probe guide 14a is "0°".

Figure 8:
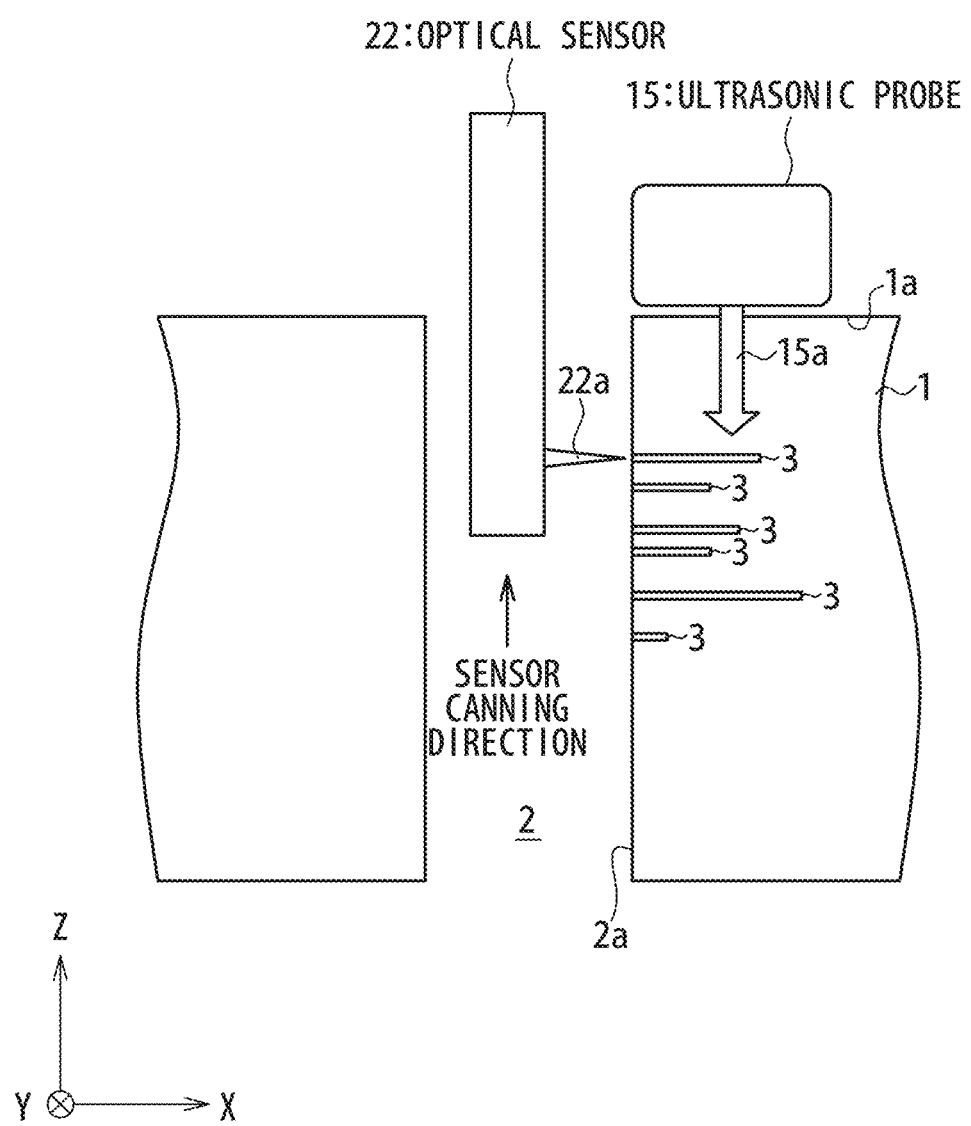
FIG. 8 is a conceptual diagram showing an ultrasonic inspection and an optical inspection which are carried out in the inspection system of the present embodiment.

Moreover, the ultrasonic inspection using the ultrasonic probe 15 and the optical inspection using the optical sensor part 16 are carried out. FIG. 8 is a conceptual diagram showing the ultrasonic inspection and optical inspection carried out by the inspection system 10 in the present embodiment.

In the ultrasonic inspection, the ultrasonic wave 15*a* is emitted from the ultrasonic probe 15 to the main surface 1*a* of the composite material member 1. In the present embodiment, the incidence direction of the ultrasonic wave 15*a* is the thickness direction (the Z-axial direction) of the composite material member 1. The reflection wave generated when the ultrasonic wave 15*a* is reflected by the composite material member 1 is received by the ultrasonic probe 15, and the output signal corresponding to the reflection wave is generated by the ultrasonic probe 15. The processor 12 generates an ultrasonic image from the output signal received from the ultrasonic probe 15, and displays the generated ultrasonic image on display device 13. If necessary (for example, if inspecting a wide range), the ultrasonic inspection is carried out while changing the position of the ultrasonic probe 15 in the probe movable direction. The change of the position of the ultrasonic probe 15 may be carried out by manually moving the ultrasonic probe 15 along the probe guide 14*a*.

On the other hand, in the optical inspection, the sensor light 22*a* emitted from the optical sensor 22 is irradiated to each position of the side wall surface 2*a* of the though-hole 2 while the position of the optical sensor part 16 is automatically moved to the sensor scanning direction (i.e. the Z-axial direction) by the actuator 14*c*. Thus, the side wall surface 2*a* of the though-hole 2 is scanned to the sensor scanning direction by the sensor light 22*a*. Moreover, the reflection light generated by reflecting the sensor light 22*a* from the side wall surface 2*a* is received by the optical sensor 22, and the output signal corresponding to the reflection light is generated by the optical sensor 22. The processor 12 generates the defect detection image from the output signal received from the optical sensor 22 to show the existence or non-existence of defect 3 in each position of the side wall surface 2*a* of the though-hole 2, and displays the generated defect detection image on the display device 13. In detail, when the defect 3 exists in a position of the side wall surface 2*a* of the though-hole 2, the sensor light 22*a* is not reflected in the position, so that the reflection light does not reach the optical sensor 22. The processor 12 generates the defect detection image to show that the defect 3 exists in the position where the reflection light did not reach the optical sensor 22. Also, when a light displacement sensor is used as the optical sensor 22, it is possible to specify the shape of the side wall surface 2*a* of the though-hole 2 from data contained in the reflection light. In this case, the processor 12 may generate a profile image showing the shape of the side wall surface 2*a* of the though-hole 2 as the defect detection image.

While changing the orientation of the probe guide 14*a* (that is, a direction in which the sensor light 22*a* is emitted) in a desired angle interval (e.g. 90°), the same inspection is repeatedly carried out. Thus, it is possible to specify the existence or non-existence of the defect 3 in the neighborhood of the though-hole 2 of the composite material member 1, and the number of defects and regions where the defects exist when the defects 3 occur. The change of orientation of the probe guide 14*a* may be carried out by manually rotating the probe guide 14*a*.

At this time, the inspection system 10 of the present embodiment has a configuration in which the optical sensor 22 is housed in the metal pipe 21 having a diameter corresponding to the diameter of the though-hole 2. According to such a configuration, when the orientation of the probe guide 14*a* (that is, the direction in which the sensor light 22*a* is emitted) is changed, the distance between the optical sensor 22 and the side wall surface 2*a* of the though-hole 2 can be kept constant. This is effective for the improvement of the precision of the optical inspection.

Figure 9:
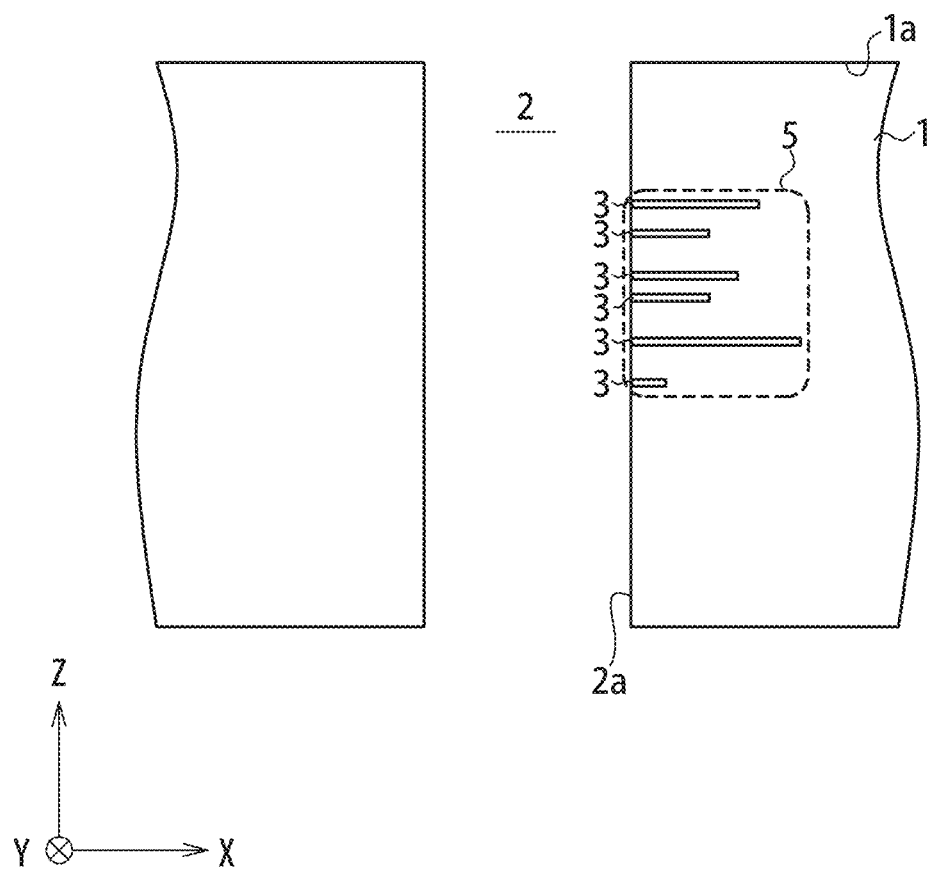
FIG. 9 is a conceptual diagram showing data acquired in an inspection procedure in the present embodiment.

According to the inspection procedure described above, even when it is assumed that a plurality of defects are arranged in the incident direction of the ultrasonic wave 15*a* emitted from the ultrasonic probe 15, data of the defects 3 can be acquired which the ultrasonic wave 15*a* cannot be supplied directly from the ultrasonic probe 15. As described with reference to FIG. 2, when only an ultrasonic probe is used, any data of the defect 3 cannot be acquired to which the ultrasonic wave cannot be supplied directly from the ultrasonic probe. On the other hand, as shown in FIG. 9, in the inspection procedure of the present embodiment, the number and positions of defects 3 on the side wall surface 2*a* of the though-hole 2 can be detected by the optical sensor 22. In other words, according to the inspection procedure of the present embodiment, the data of the number of defects 3 and a region 5 where the defects 3 exist, on the side wall surface 2*a* of the though-hole 2 can be acquired. Especially, like the present embodiment, in the inspection of the composite material member 1 having the though-hole 2 formed by drilling, the defect 3 is important which occurs due to interlayer delamination on the side wall surface 2*a* of the though-hole 2. The utility of the inspection procedure of the present embodiment is great.

Figure 10:
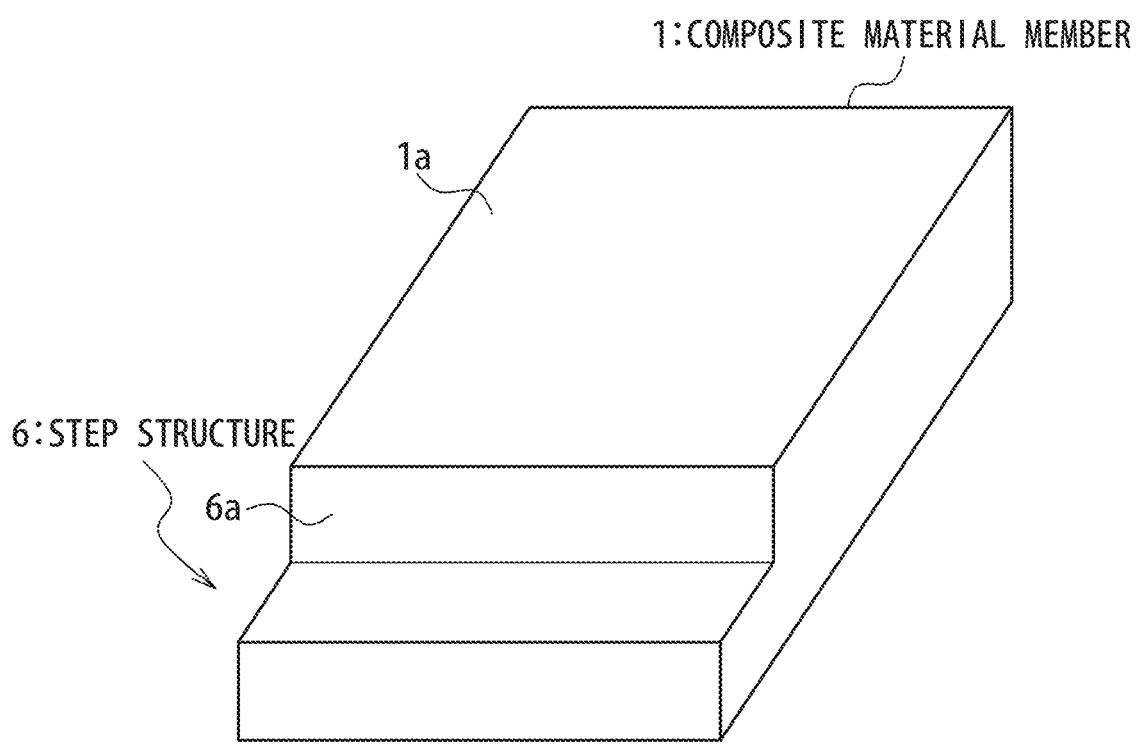
FIG. 10 is a perspective view showing another example of structure of the composite material member to be inspected in the present embodiment.

In the above-mentioned embodiments, the inspection is carried out to detect the defects 3 occurring along the side wall surface 2*a* of the though-hole 2 of the composite material member 1 in which the though-hole 2 is formed. However, the inspection system and the inspection method in the present embodiment can be applied to various structures in which a defect occur in the intersection surface intersecting the main surface of the composite material member. For example, the inspection system and the inspection method in the present embodiment can be used for inspection of the composite material member 1 having a step structure 6 as shown in FIG. 10. In this case, the ultrasonic probe 15 is pushed against the main surface 1*a* of the composite material member 1, the step surface 6*a* (the surface orthogonal to the main surface 1*a*) of the step structure 6 is scanned by the optical sensor part 16. In this case, too, it is possible to inspect the number of defects exposed on the step surface 6*a* of the composite material member 1 and the region where the defects exist.

As described above, the embodiments of the present invention have been specifically described. However, the present invention is not limited to the above-mentioned embodiments. It would be understood by the skilled person that present invention can be implemented in various changes or modifications.

The present application is based on Japanese Patent Application No. JP 2016-226203 filed on Nov. 21, 2016, and claims a priority based on the Application. The disclosure of the Application is incorporated herein by reference.

The invention claimed is:

1. An inspection system to inspect a composite material member formed of a composite material and having a main surface and a through-hole penetrating the composite material member from the main surface in a first direction, comprising:

a main body part;

an ultrasonic probe connected to the main body part and configured to contact the main surface;

an optical sensor part configured to be inserted in the through-hole and connected to the main body part to be movable in the first direction; and a processor, wherein the ultrasonic probe is configured to input ultrasonic wave to the main surface of the composite material member and to receive reflection wave generated from the ultrasonic wave reflected by the composite material member, wherein the optical sensor part is configured to emit sensor light in a second direction orthogonal to the first direction and receive reflection light generated from the sensor light reflected on a side wall surface of the through-hole, wherein the processor is configured to output a measurement result based on the reflection wave and the reflection light, and wherein the main body part is configured to hold the ultrasonic probe to be movable in a third direction along the main surface in a state in which the optical sensor part is inserted in the through-hole.

2. The inspection system according to claim 1, further comprising:

an actuator configured to move the optical sensor part in the first direction, wherein the emission of the sensor light and the reception of the reflection light are carried out while moving the optical sensor part in the first direction by the actuator.

3. The inspection system according to claim 1, wherein the third direction is orthogonal to the first direction.

4. The inspection system according to claim 1, wherein the optical sensor part comprises:

an optical sensor configured to emit a sensor light, receive a reflection light and generate an output signal corresponding to the reflection light; and a pipe member having a circular cylindrical surface which has a central axis parallel to the first direction, wherein the optical sensor is housed in the pipe member, and wherein the pipe member is connected to the main body part to be movable in the first direction.

5. An inspection device configured to inspect a composite material member formed of a composite material which has a main surface and a through-hole penetrating the composite material from the main surface in a first direction, the inspection device comprising:

a main body part;

an ultrasonic probe connected to the main body part and brought into contact with the main surface; and an optical sensor part configured to be inserted in the through-hole and connected to the main body part to be movable in the first direction, wherein the ultrasonic probe is configured to output an ultrasonic wave to the main surface of the composite material, receive a reflection wave generated by reflecting the ultrasonic wave by the composite material, and output a first output signal corresponding to the reflection wave, wherein the optical sensor part is configured to output sensor light in a second direction orthogonal to the first direction, receive the reflection light generated by reflecting the sensor light on a side wall surface of the through-hole, and output a second output signal corresponding to the reflection light, wherein the main body part is configured to hold the ultrasonic probe to be movable in a third direction along the main surface in a state in which the optical sensor part is inserted in the through-hole.

6. An inspecting method of inspecting a composite material member which has a main surface and a through-hole penetrating the composite material member from the main surface in a first direction, comprising:

(A) bringing an ultrasonic probe into contact with the main surface to output an ultrasonic wave from the ultrasonic probe to the main surface;

(B) receiving a reflection wave generated by reflecting the ultrasonic wave by the composite material member;

(C) outputting a sensor light in a second direction orthogonal to the first direction from an optical sensor part inserted in the through-hole while moving the optical sensor part in the first direction along a side wall surface of the through hole;

(D) receiving a reflection light generated by reflecting the sensor light on the side wall surface; and (E) outputting a measurement result acquired based on the reflection wave and the reflection light, wherein bringing the ultrasonic probe into contact with the main surface comprises adjusting a position of the ultrasonic probe in a third direction along the main surface in a state in which the optical sensor part is inserted in the through-hole.

7. The inspecting method according to claim 6, wherein the through-hole is formed through the composite material member by drilling.

8. The inspecting method according to claim 7, wherein the optical sensor is housed in a pipe member which has a circular cylindrical surface which has a central axis parallel to the first direction, and wherein the pipe member has a diameter corresponding to a diameter of the through-hole.

9. The inspecting method according to claim 8, further comprising:

repeatedly carrying out the (A) to (E) while changing an orientation of the second direction.

* * * * *